(12) United States Patent
Gao et al.

(10) Patent No.: US 10,909,329 B2
(45) Date of Patent: Feb. 2, 2021

(54) MULTILINGUAL IMAGE QUESTION ANSWERING

(71) Applicant: Baidu USA, LLC, Sunnyvale, CA (US)

(72) Inventors: Haoyuan Gao, Beijing (CN); Junhua Mao, Los Angeles, CA (US); Jie Zhou, Beijing (CN); Zhiheng Huang, Sunnyvale, CA (US); Lei Wang, Beijing (CN); Wei Xu, Saratoga, CA (US)

(73) Assignee: Baidu USA LLC, Sunnyvale, CA (US)

( * ) Notice: Subject to any disclaimer, the term of this patent is extended or adjusted under 35 U.S.C. 154(b) by 869 days.

(21) Appl. No.: 15/137,179

(22) Filed: Apr. 25, 2016

(65) Prior Publication Data

US 2016/0342895 A1 Nov. 24, 2016

Related U.S. Application Data

(60) Provisional application No. 62/164,984, filed on May 21, 2015.

(51) Int. Cl.
*G06F 40/56* (2020.01)
*G06N 3/04* (2006.01)
*G06N 5/04* (2006.01)

(52) U.S. Cl.
CPC ........... *G06F 40/56* (2020.01); *G06N 3/0445* (2013.01); *G06N 3/0454* (2013.01); *G06N 5/04* (2013.01)

(58) Field of Classification Search
CPC ............. G06F 16/3329; G06F 16/3344; G06F 16/334; G06F 3/048; G06F 17/2785;
(Continued)

(56) References Cited

U.S. PATENT DOCUMENTS 8,150,872 B2 4/2012 Bernard
8,719,015 B2 5/2014 Jang et al.
(Continued)

FOREIGN PATENT DOCUMENTS

CN 102637192 A 8/2012
CN 103793434 A 5/2014
(Continued)

OTHER PUBLICATIONS

G. E. Hinton, S. Osindero, Y. Teh, "A Fast Learning Algorithm for Deep Belief Nets," 2006, Neural Computation 18, pp. 1527-1554 (Year: 2006).*
(Continued)

*Primary Examiner* — Miranda M Huang
*Assistant Examiner* — Catherine F Lee
(74) *Attorney, Agent, or Firm* — North Weber & Baugh LLP

(57) ABSTRACT

Embodiments of a multimodal question answering (mQA) system are presented to answer a question about the content of an image. In embodiments, the model comprises four components: a Long Short-Term Memory (LSTM) component to extract the question representation; a Convolutional Neural Network (CNN) component to extract the visual representation; an LSTM component for storing the linguistic context in an answer, and a fusing component to combine the information from the first three components and generate the answer. A Freestyle Multilingual Image Question Answering (FM-IQA) dataset was constructed to train and evaluate embodiments of the mQA model. The quality of the generated answers of the mQA model on this dataset is evaluated by human judges through a Turing Test.

20 Claims, 9 Drawing Sheets

(58) Field of Classification Search
CPC ............... G06F 17/241; G06F 16/245; G06F 16/24522; G06Q 50/01; G06Q 20/12; G06Q 30/0625; G06N 20/00; G06N 3/0445; G06N 3/04; G06N 3/08; G06N 3/0454; G06N 5/04; G06N 5/02; G06N 3/084; G06N 5/00
See application file for complete search history.

(56) References Cited

U.S. PATENT DOCUMENTS

| | | | |
|---|---|---|---|
| 8,768,925 B2 * | 7/2014 | Brown | G06F 17/28 707/736 |
| 8,873,813 B2 | 10/2014 | Tadayon et al. | |
| 2008/0131001 A1 | 6/2008 | Hofman et al. | |
| 2011/0153312 A1 | 6/2011 | Roberts | |
| 2015/0186537 A1 | 7/2015 | Baidu | |
| 2015/0325236 A1 | 11/2015 | Levit et al. | |

FOREIGN PATENT DOCUMENTS

| | | |
|---|---|---|
| CN | 104538028 A | 4/2015 |
| JP | 2002342738 A | 8/2008 |
| JP | 2009543203 A | 12/2009 |

OTHER PUBLICATIONS

Y. LeCun, L. Botton, G. B. Orr, K. Mueller, "Efficient BackProp," 1998, Springer, pp. 1-44 (Year: 1998).*
J. Ngiam, A. Khosla, M. Kim, J. Nam, H. Lee, A. Y. Ng, "Multimodal Deep Learning," 2011, Proceddings of the 28th International Conference on Machine Learning, pp. 1-8 (Year: 2011).*
M. Ren, R. Kiros, R. Zemel, "Image Question Answering: A Visual Semantic Embedding Model and a New Dataset," 2015, International Conference on Machine Learning (ICML), pp. 1-10 (Year: 2015).*
I. Sutskever, O. Vinyals, Q. V. Le, "Sequence to Sequence Learning with Neural Networks," 2014, CoRR, abs/1409.3215, pp. 1-9 (Year: 2014).*
Malinowski, M., et al., "Ask Your Neurons: A Neural-based Approach to Answering Questions about Images," May 5, 2015, arXiv:1505.01121v1 [cs.CV], pp. 1-9 (Year: 2015).*
Donahue, J., et al. ("Long-term Recurrent Convolutional Networks for Visual Recognition and Description," Feb. 17, 2015, arXiv:1411.4389v3 [cs.CV], pp. 1-13 (Year: 2015).*
Bandanau et al., Neural Machine Translation by Jointly Learning to Align and Translate, Apr. 2015, ICLR, arXiv:1409.0473v6 [cs.CL], pp. 1-15 (Year: 2015).*
LeCun et al., "Efficient backprop. In Neural networks: Tricks of the trade," p. 9-48, 2012 (44pgs).
Lin et al., "Microsoft COCO: Common objects in context," arXiv preprint arXiv:1405.0312, 2014 (15pgs).
Malinowski et al., "A multi-world approach to question answering about real-world scenes based on uncertain input," in Advances in Neural Information Processing Systems, p. 1682-1690, 2014 (9pgs).
Malinowski et al., "Ask your neurons: A neural-based approach to answering questions about images," arXiv preprint arXiv:1505.01121, 2015 (13pgs).
Mao et al., "Deep captioning with multimodal recurrent neural networks (M-RNN)," in ICLR, 2015 (17pgs).
Mao et al., "Learning like a child: Fast novel visual concept learning from sentence descriptions of images," arXiv preprint arXiv: 1504.06692, 2015 (9 pgs).
Mao et al., "Explain images with multimodal recurrent neural networks," NIPS DeepLearning Workshop, 2014 (9pgs).
Mikolov et al., "Learning longer memory in recurrent neural networks," arXiv preprint arXiv:1412.7753, 2014 (9pgs).
Mikolov et al., "Recurrent neural network based language model," in Interspeech, p. 1045-1048, 2010 (4pgs).
Vedantam et al., "CIDEr: Consensus-based image description evaluation," in CVPR, 2015 (17pgs).
Vinyals et al., "Show and tell: A neural image caption generator," in CVPR, 2015 (9pgs).
Wu et al., "Verbs semantics and lexical selection," in ACL, p. 133-138, 1994 (7pgs).
Xu et al., "Show, attend and tell: Neural image caption generation with visual attention," arXiv preprint arXiv:1502.03044, 2015 (22pgs).
Zhu et al., "Learning from weakly supervised data by the expectation loss svm (e-SVM) algorithm," in NIPS, p. 1125-1133, 2014 (9pgs).
Grubinger et al., "The IAPR TC-12 benchmark: A new evaluation resource for visual information systems," in International Workshop OntoImage, p. 13-23,2006 (11pgs).
Hochreiter et al., "Long short-term memory," Neural computation, 9(8):1735-1780, 1997 (32pgs).
Kalchbrenner et al., "Recurrent continuous translation models," in EMNLP, p. 1700-1709, 2013 (10pgs).
Karpathy et al., "Deep visual-semantic alignments for generating image descriptions," in CVPR, 2015 (17pgs).
Klein et al., "Fisher vectors derived from hybrid gaussian-laplacian mixture models for image annotation," arXiv preprint arXiv:1411.7399 2014 (12pgs).
Krizhevsky et al., "Imagenet classification with deep convolutional neural networks," in NIPS, 2012 (9pgs).
Lavie et al., "Meteor: An automatic metric for MT evaluation with high levels of correlation with human judgements," in Workshop on Statistical Machine Translation, p. 228-231. Association for Computational Linguistics, 2007 (8pgs).
Lebret et al., "Simple image description generator via a linear phrase-based approach," arXiv preprint arXiv:1412.8419, 2014 (7pgs).
Antol, et al., "Vqa: Visual question answering," arXiv preprint arXiv:1505.00468, 2015 (23pgs).
Bigham et al. "Vizwiz: nearly real-time answers to visual questions," in ACM symposium on User interface software and technology, pp. 333-342, 2010 (10pgs).
Chen, et al., "Semantic image segmentation with deep convolutional nets and fully connected CRFs," ICLR, 2015 (14pgs).
Cho, et al., "Learning phrase representations using RNN encoder-decoder for statistical machine translation," arXiv preprint arXiv:1406.1078, 2014 (15pgs).
Donahue, et al., "Long-term recurrent convolutional networks for visual recognition and description," in CVPR, 2015 (13pgs).
Elman, "Finding structure in time," Cognitive science, 14(2):179-211, 1990 (33pgs).
Fang, et al. "From captions to visual concepts and back," in CVPR, 2015 (10pgs).
Geman, et al., "Visual turing test for computer vision systems," PNAS, 112(12):3618-3623, 2015 (6pgs).
Girshick, et al., "Rich feature hierarchies for accurate object detection and semantic segmentation," in CVPR, 2014 (21pgs).
International Search Report dated Sep. 1, 2016, in International Patent Application No. PCT/US2016/033363, filed May 19, 2016 (8 pgs).
Written Opinion dated Sep. 1, 2016, in International Patent Application No. PCT/US2016/033363, filed May 19, 2016 (9 pgs).
Gao et al.,"Are You Talking to a Machine? Dataset and Methods for Multilingual Image Question Answering", <URL: http://arxiv.org/pdf/1505.05612v3.pdf>, Nov. 2, 2015, (10pgs).
Mikolov et al., "Distributed representations of words and phrases and their compositionality," in NIPS, p. 3111-3119, 2013 (9pgs).
Nair et al., "Rectified linear units improve restricted Boltzmann machines," in ICML, p. 807-814, 2010 (8pgs).
Papineni et al., "Bleu: a method for automatic evaluation of machine translation," in ACL, p. 311-318, 2002 (8pgs).
Russakovsky et al., "ImageNet Large Scale Visual Recognition Challenge," arXiv preprint arXiv:1409.0575, 2014 (43pgs).
Simonyan et al., "Very deep convolutional networks for large-scale image recognition," in ICLR, 2015 (14pgs).
Sutskever et al., "Sequence to sequence learning with neural networks," in NIPS, p. 3104-3112, 2014 (9pgs).

(56) References Cited

OTHER PUBLICATIONS

Szegedy et al., "Going deeper with convolutions," arXiv preprint arXiv:1409.4842, 2014 (12pgs).
Tu et al., "Joint video and text parsing for understanding events and answering queries," MultiMedia, IEEE, 21(2):42-70, 2014 (24pgs).
Turing, "Computing machinery and intelligence," Mind, p. 433-460, 1950 (22pgs).
Chen et al., "Learning a recurrent visual representation for image caption generation," in CVPR, arXiv preprint, arXiv:1411.5654v1, 2014 (10 pgs).
Kiros et al., "Unifying visual-semantic embeddings with multimodal neural language models," TACL, arXiv preprint, arXiv:1411.2539v1, 2014 (13 pgs).
Ren et al., "Image Question Answering: A Visual Semantic Embedding Model and a New Dataset," arXiv preprint, arXiv:1505.02074v1, 2015 (10 pgs).
Young et al., "From image descriptions to visual denotations: New similarity metrics for semantic inference over event descriptions," in ACL, p. 67-78, 2014 (12 pgs).
Sutskever et al.,"Sequence to Sequence Learning with Neural Networks", arXiv preprint arXiv:1409.3215, 2014. (9pgs).
Search Report dated Dec. 6, 2018, in European Patent Application No. EP 16797334. (15 pgs).
Kiela et al.,"Learning Image Embeddings using Convolutional Neural Networks for Improved Multi-Modal Semantics," in Proceedings of the 2014 Conference on Empirical Methods in Natural Language Processing (EMNLP), pp. 36M5, Oct. 25-29, 2014. (10pgs).
Zou et al.,"Bilingual Word Embeddings for Phrase-Based Machine Translation," [online], [Retrieved Apr. 11, 2020] Retrieved from Internet <URL: https://ai.stanford.edu/~wzou/emnlp2013_ZouSocherCerManning.pdf> (6pgs).
Search Report and Written Opinion dated Oct. 12, 2019, in Chinese Patent Application No. CN 2016/80002903.0, with machine translation. (14 pgs).
Office Action dated Jun. 12, 2018, in Japanese Patent Application No. JP 2017514532, with machine translation. (10 pgs).

\* cited by examiner

Image — Image of a cat sitting on an umbrella

Question — What is the cat doing?

Answer — Sitting on the umbrella.

700

705

Image

Generated Question: 电脑在哪里?
Where is the computer?

Answer: 在桌子上。
On the desk.

MULTILINGUAL IMAGE QUESTION ANSWERING

CROSS-REFERENCE TO RELATED APPLICATION

This application claims the priority benefit under 35 USC § 119(e) to commonly assigned and U.S. Provisional Patent Application No. 62/164,984, filed on May 21, 2015, entitled "Dataset and Methods for Multilingual Image Question Answering" and listing Haoyuan Gao, Junhua Mao, Jie Zhou, Zhiheng Huang, Lei Wang, and Wei Xu as inventors. The aforementioned patent document is incorporated by reference herein in its entirety.

BACKGROUND

A. Technical Field

The present invention relates generally to improving the interfacing of human-computer interactions. More particularly, the present disclosure relates to systems and methods for improving the automation of question answering from image and question inputs.

B. Description of the Related Art

Question Answering (QA) is a computer science discipline within the fields of information retrieval and natural language processing (NLP), which is related to building a system that automatically answers questions posed by humans in a natural language setting. In information retrieval, an open domain question answering system aims to return an answer in response to the user's question. The system uses a combination of techniques from computational linguistics, information retrieval and knowledge representation for finding answers.

Many studies have been made on the task of image captioning. Most of them are built based on deep neural networks (e.g., deep Convolutional Neural Networks), Recurrent Neural Network (RNN) or Long Short-Term Memory (LSTM). The large-scale image datasets with sentence annotations play a crucial role in this progress. Despite the success of these methods, there are still many issues to be explored and resolved. In particular, the task of image captioning only requires generic sentence descriptions of an image. But in many cases, only a particular part or object of an image is of interest. The image captioning task lacks the interaction between the computer and the user, since the users cannot input their preference and interest.

Accordingly, what is needed are systems and methods that provide improved question answering given an image and an input question.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1A:
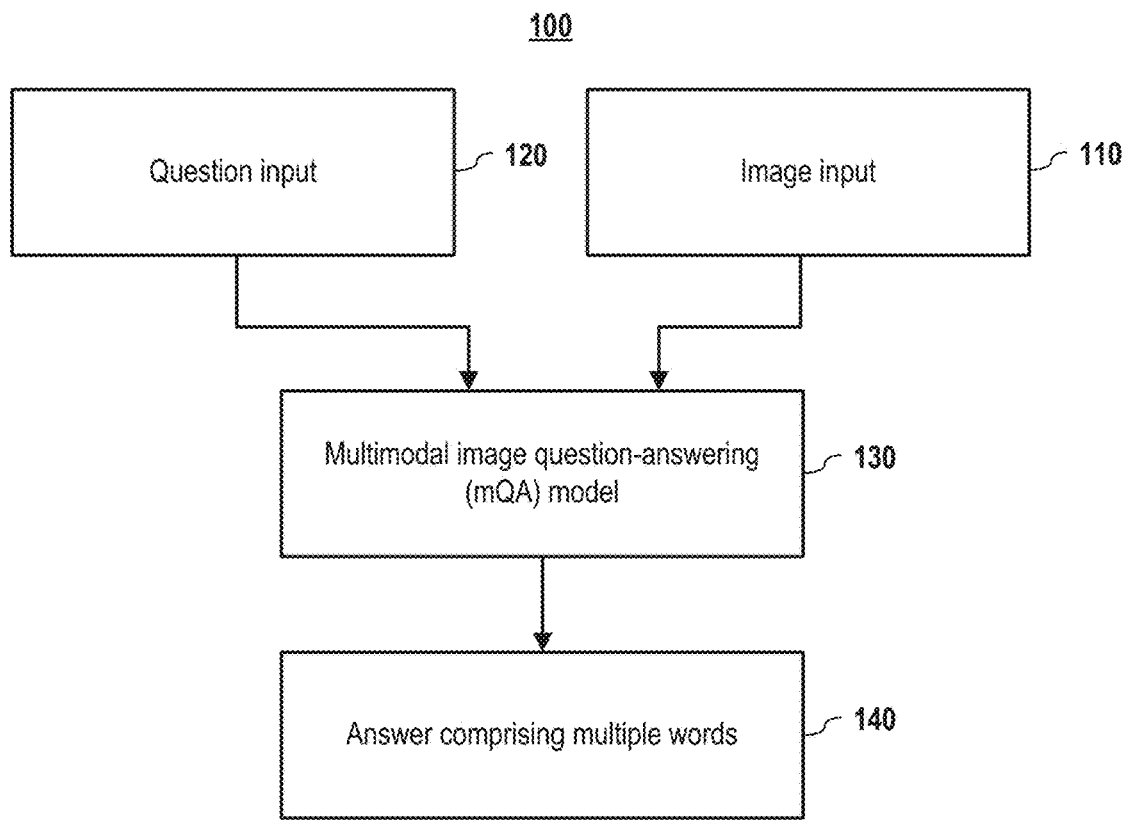
FIG. 1A ("FIG. 1A") depicts a block diagram for image question answering model according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled"

shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments. Furthermore, the use of certain terms in various places in the specification is for illustration and should not be construed as limiting. Any headings used herein are for organizational purposes only and shall not be used to limit the scope of the description or the claims.

It shall be noted that these experiments and results are provided by way of illustration and were performed under specific conditions using a specific embodiment or embodiments; accordingly, neither these experiments nor their results shall be used to limit the scope of the disclosure of the current patent document. Furthermore, it shall be noted that: (1) certain steps may optionally be performed; (2) steps may not be limited to the specific order set forth herein; (3) certain steps may be performed in different orders; and (4) certain steps may be done concurrently.

A. Introduction

Recently, there is increasing interest in the field of multimodal learning for both natural language and vision. In particular, many studies have made rapid progress on the task of image captioning. Most of them are built based on deep neural networks, Recurrent Neural Network or Long Short-Term Memory. The large-scale image datasets with sentence annotations play a crucial role in this progress. Despite the success of these methods, there are still many issues to be addressed. In particular, the task of image captioning only requires generic sentence descriptions of an image. But in many cases, a particular part or object of an image is the subject of attention. Currently, the image captioning approaches lack the interaction between the computer and the user (as user preference and interest are not considered in these approaches).

Figure 1B:
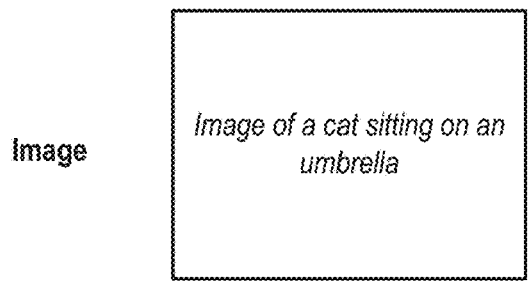
FIG. 1B depicts a sample answer to a visual question generated by an embodiment of a multimodal question answering (mQA) system according to embodiments of the present disclosure.

The task of visual question answering with improved user-computer interfacing is a focus of embodiments disclosed herein. In this task, embodiments provide an answer to a freestyle question about the content of an image, which greatly enhances the interaction between the computer and the user as compared to prior approaches. Embodiments of a multimodal question answering (mQA) model were developed to address this task. FIG. 1A depicts a block diagram for image question answering model according to embodiments of the present disclosure. The mQA model 130 receives an image input 120 and a question input 110 related to the image input and generates an answer 140 comprising multiple words. Current approaches provide simple one-word answers. Providing multiple word answers, including full sentences, enhance both the computer-user interaction and utility but do so dramatically increases the complexity. In embodiments, the mQA model 130 receives the question input and an image input via the same or different input interface. FIG. 1B depicts a sample answer to a visual question generated by an embodiment of an mQA system according to embodiments of the present disclosure. Although the image, the question, and the answer are shown together in FIG. 1B, it is understood that they may be arranged differently; for example, the question, the answer, or both may be may be in a text format, an audio format, or a combination thereof.

Figure 2:
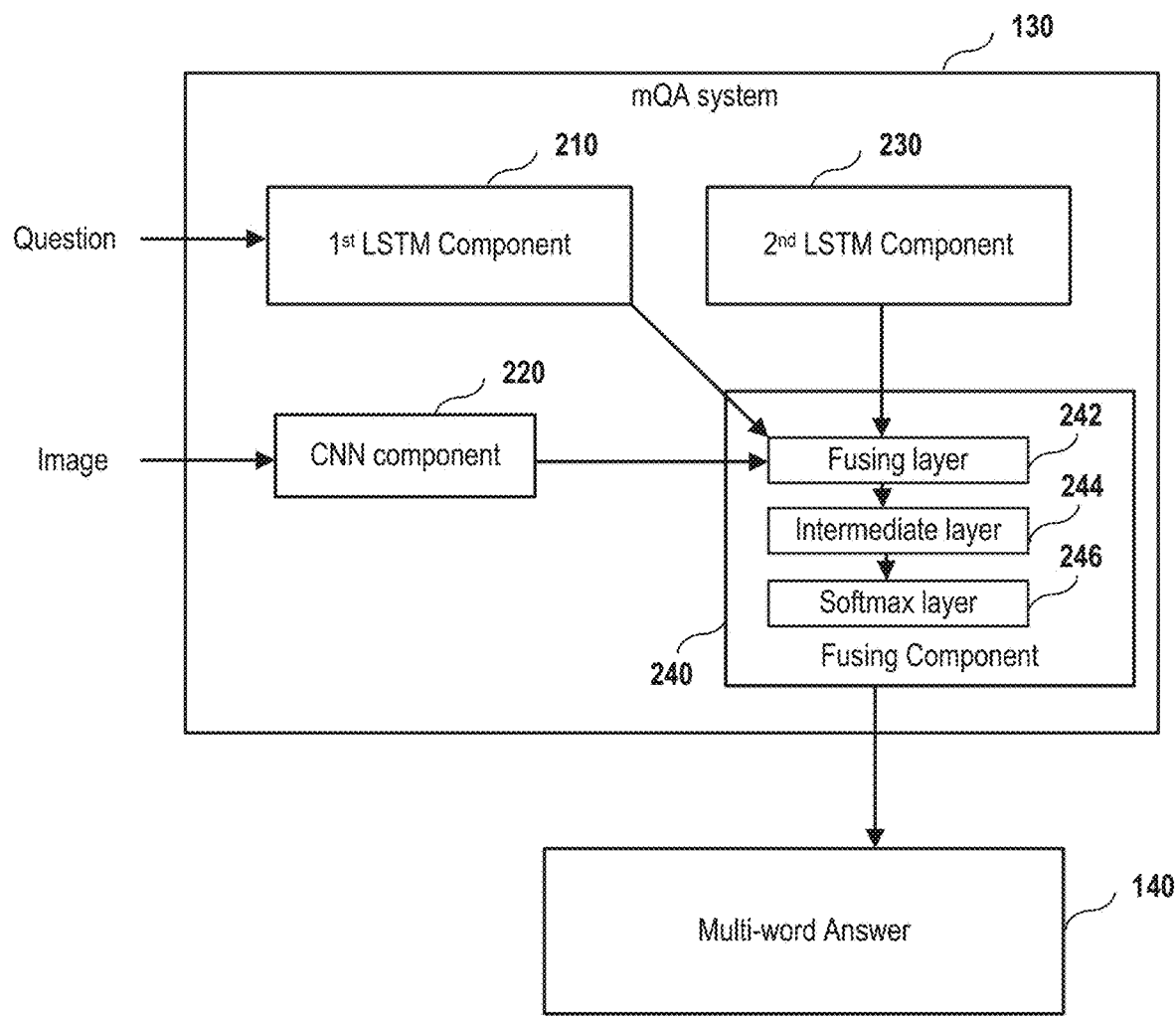
FIG. 2 depicts a component diagram for a multimodal question answering (mQA) model according to embodiments of the present disclosure.

In embodiments, an mQA model 130 comprises four components, as shown in FIG. 2. In embodiments, the first component 210 is a Long Short-Term Memory (LSTM) component that receives the question input 120 and encodes a natural language sentence of the question input into a dense vector representation. In embodiments, the second component 220 is a deep Convolutional Neural Network (CNN) component that receives the image input and extracts an image representation. In embodiments, the CNN may be pre-trained and fixed during the training. In embodiments, the third component 230 is a second LSTM component that encodes the information of a current word and previous words in the answer into dense representations. In embodiments, the fourth component 240 is a fusing component that fuses information from prior components to predict the next word in the answer. In embodiments, the fusing component 240 comprises a fusing layer 242, an intermediate layer 244, and a Softmax layer 246. In embodiments, the fusion layer 242 is communicatively coupled to the first three components to fuses information from these components to generate a dense multimodal representation that is used to help predict the next word in the answer. It shall be noted, however, that the mQA system may be differently configured, and the fusing layer may fuse information fewer or more components. For example, the first component may feed into the third component and the fusing layer may only the second and third component outputs. In embodiments, the intermediate layer 244 maps the dense multimodal representation in the fusing layer back to a dense word representation. In embodiments, the Softmax layer 246 predicts the probability distribution of the next word in the answer.

In embodiments, the first, third, and fourth components are jointly trained by maximizing the probability of the ground truth answers in the training set using a log-likelihood loss function. To lower the risk of overfitting, weight sharing of the word embedding layer between the LSTMs in the first and third components may be used. A transposed weight sharing scheme may also be adopted to allow weight sharing between the word embedding layer and the fully connected Softmax layer.

In embodiments, to train an mQA model, a large-scale Freestyle Multilingual Image Question Answering dataset (FM-IQA, see details in Section D) was constructed based on the Microsoft Common Objects in Context (MS COCO) dataset. The current version of the dataset contains 158,392 images with 316,193 Chinese question-answer pairs and their corresponding English translations. To diversify the annotations, the annotators were allowed to raise any question related to the content of the image. Strategies proposed herein monitor the quality of the annotations. This dataset contains a wide range of artificial intelligence (AI) related questions, such as action recognition (e.g., "Is the man trying to buy vegetables?"), object recognition (e.g., "What is there in yellow?"), positions and interactions among objects in the image (e.g. "Where is the kitty?") and reasoning based on common sense and visual content (e.g. "Why does the bus park here?").

Because of the variability of the freestyle question-answer pairs, it is hard to accurately evaluate using automatic metrics. A Visual Turing Test was conducted using human judges. Specifically, the question-answer pairs generated by an embodiment of the mQA system are mixed with the same set of question-answer pairs labeled by annotators. Human judges were involved to determine whether the answer was given by a model or a human. In addition, the judges were also asked to give a score of 0 (i.e. wrong), 1 (i.e. partially correct), or 2 (i.e. correct). The results show that the tested embodiment of an mQA system passed 64.7% of this test (treated as answers of a human) and the average score is 1.454. In the discussion section herein, an mQA system that includes or is combined with an m-RNN model can automatically ask a question about an image and answer that question.

B. Related Work

Recent work has made significant progress using deep neural network models in both the fields of computer vision and natural language. For computer vision, methods based on Convolutional Neural Network achieve the state-of-the-art performance in various tasks, such as object classification, detection and segmentation. For natural language, the Recurrent Neural Network (RNN) and the Long Short-Term Memory network (LSTM) are also widely used in machine translation and speech recognition.

Embodiments of an mQA system were inspired in part by the m-RNN model for the image captioning and image-sentence retrieval tasks. It adopts a deep CNN for vision and a RNN for language. Embodiments of the model may be extended to handle the input of question and image pairs, and generate answers. In the experiments, it was found that an mQA system can learn how to ask a good question about an image using the m-RNN model, and this question can be answered by an embodiment of an mQA system.

There has been recent effort on the visual question answering task. However, most of them use a pre-defined and restricted set of questions. Some of these questions are generated from a template. In addition, the FM-IQA dataset is much larger than the dataset in those prior arts.

There are some concurrent and independent works on this topic: some propose a largescale dataset also based on MS COCO. They also provide some simple baseline methods on this dataset. Compared to their method, embodiments based upon the teachings disclosed herein for this task are better, and human judges were used to perform the at least some of the evaluations. The dataset also contains two different kinds of language, which can be useful for other tasks, such as machine translation. Because a different set of annotators and different requirements of the annotation are used, the proposed dataset and the aforementioned largescale dataset based on MS COCO can be complementary to each other, and lead to some interesting topics, such as dataset transferring for visual question answering.

Some other researches use a model containing a single LSTM and a CNN. They concatenate the question and the answer, which is a single word or preferable to be a single word, and then feed them to the LSTM. Different from them, embodiments of the current disclosure use two separate LSTMs for questions and answers respectively in consideration of the different properties (e.g. grammar) of questions and answers, while allow the sharing of the word-embeddings. For the dataset, some prior approaches adopted a dataset much smaller than the FM-IQA dataset. Some other prior approaches utilized the annotations in MS COCO and synthesize a dataset with four pre-defined types of questions (i.e. object, number, color, and location). They also synthesize the answer with a single word. These datasets can also be complementary to the FM-IQA dataset.

C. Embodiments of a Multimodal QA (mQA) System

Figure 3:
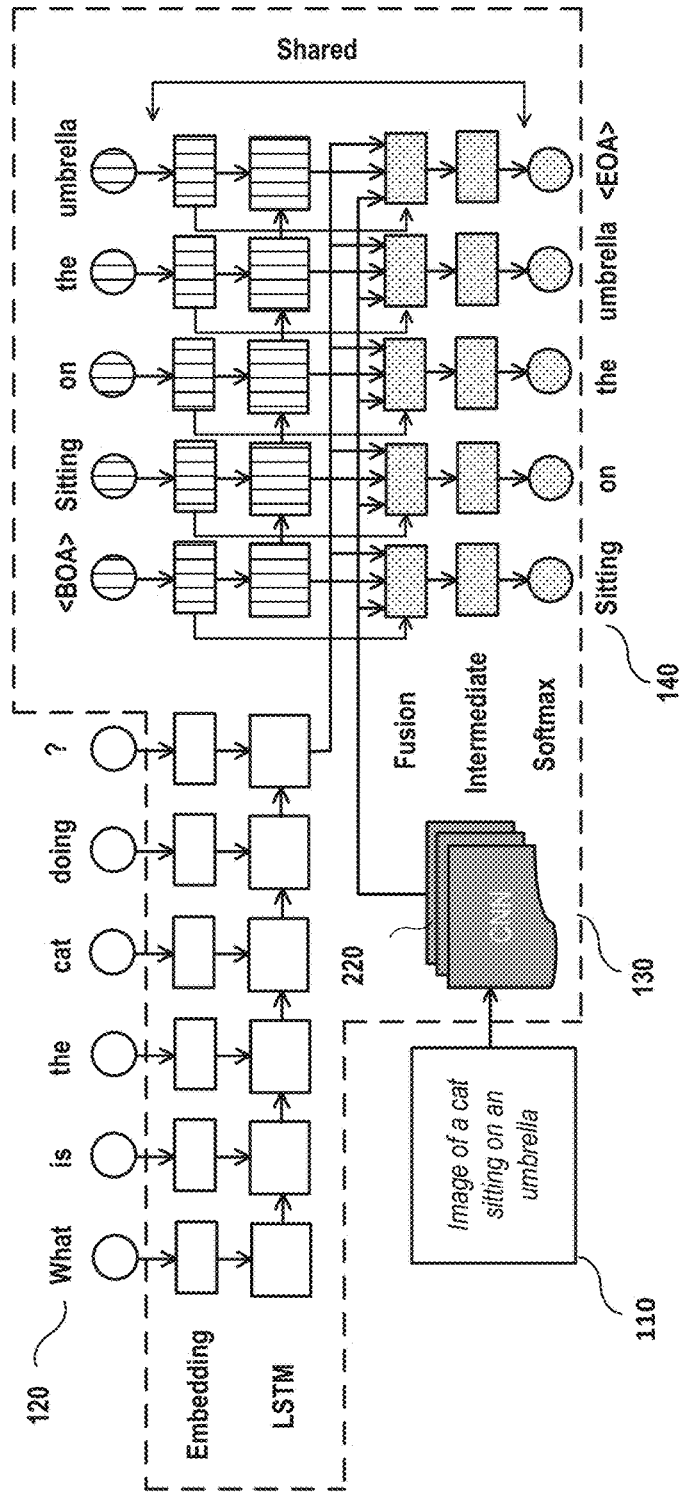
FIG. 3 depicts a multimodal question answering (mQA) model architecture according to embodiments of the present disclosure.

An exemplary architecture of an mQA model is shown in FIGS. 2 and 3 according to embodiments of the present disclosure. In embodiments, the model comprises four components: (I) a first Long Short-Term Memory (LSTM) 210 for extracting semantic representation of a question, (II) a deep Convolutional Neural Network (CNN) 220 for extracting the image representation, (III) a second LSTM 230 to extract representation of the current word in the answer and its linguistic context, and (IV) a fusing component 240 that incorporates the information from the first three parts together and generates the next word in the answer. In some embodiments, these four components are jointly trained together. The details of the four model components are described in subsection 1 below. The effectiveness of the important components and strategies are analyzed in Section E, subsection 3. In FIG. 3, the first LSTM component comprises unfilled blocks, the second LSTM component comprises vertical line filled blocks and the fusing component comprises dot-filled blocks.

Figure 4:
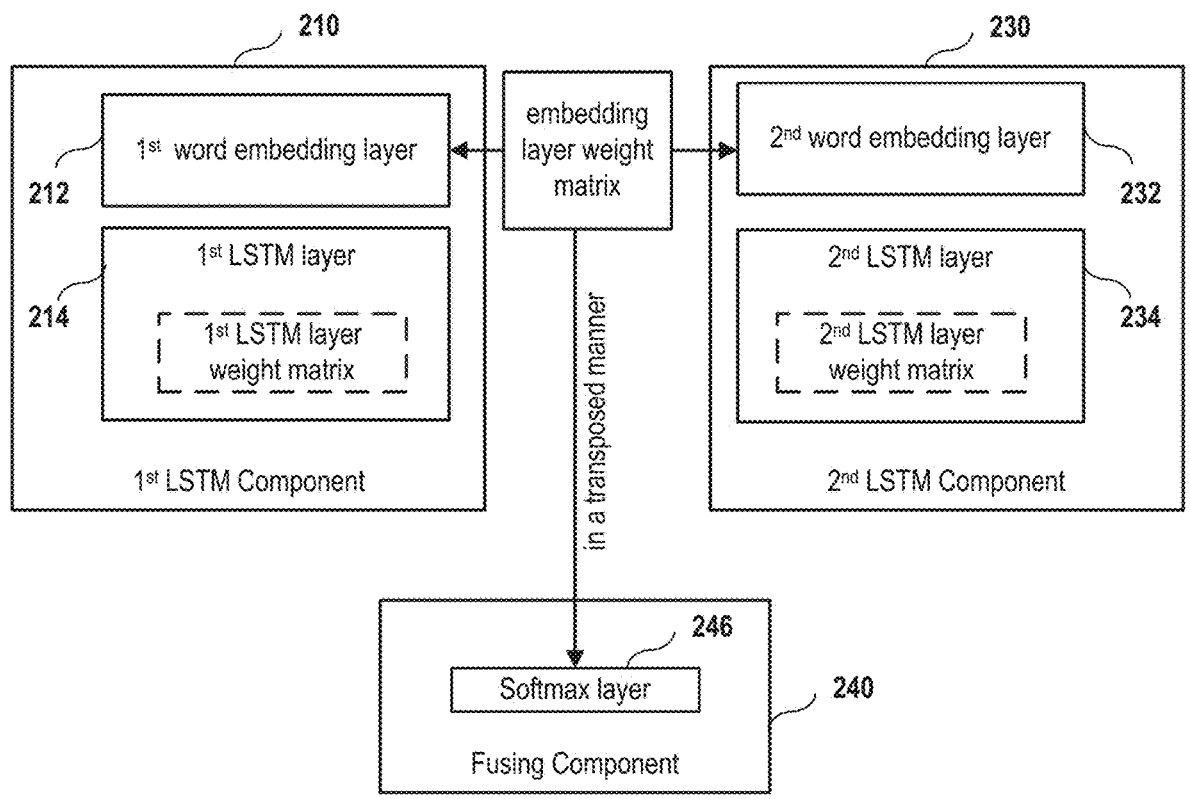
FIG. 4 depicts a component diagram for the first LSTM component and the second LSTM component according to embodiments of the present disclosure.

FIG. 4 depicts an exemplary component diagram for the first LSTM component and the second LSTM component model according to embodiments of the present disclosure. The first LSTM component 210 comprises a first word embedded layer 212 and a first LSTM layer 214. The second LSTM component 230 comprises a second word embedded layer 232 and a second LSTM layer 234. In embodiments, the weight matrix in the word embedding layers of the two LSTMs (one for the question and one for the answer) are shared. In addition, in embodiments, the shared weight matrix in the word embedding layers is also shared with a weight matrix in the Softmax layer 246 in a transposed manner (also shown in FIG. 3). In embodiments, the weight matrix in the second LSTM layer is not shared with the weight matrix in the first LSTM layer in the first component.

The adoption of two separate components (LSTMs) for questions and answers respectively while allow the sharing weight matrix between these two components (in the word embedding layers) provides a unique advantage compared to the prior arts. On one hand, taking consideration of the different properties (e.g. grammar) of questions and answers, using separate different LSTMs enables a more "authentic" answer which provides a more natural and engaging interface for a user to use the image-question-answer model. On the other hand, by sharing weight matrix between these two components, the overall answer generation process may be streamlined and simplified, which allows faster computation time without scarifying the "authentic" quality of the answer generated. Furthermore, a multiple words answer would enable the mQA model capable of answering more complex questions, including free-style questions. The answer can be complex sentences. Therefore, the utility of the mQA model is also greatly enhanced.

In embodiments, the inputs of to the model are a reference image 110 and a question 120 related to the image. In embodiments, the model is trained to generate an answer to the question. In embodiments, the words in the question and answer are represented by one-hot vectors (i.e., binary vectors with the length of the dictionary size N and have only one non-zero vector indicating its index in the word dictionary). A<BOA> (beginning of answer) sign and an <EOA> (end of answer) sign are added, as two spatial words in the word dictionary, at the beginning and the end of the training answers, respectively. They will be used for generating the answer to the question in the testing/use stage.

In the testing/use stage, an image and a question about the image are input into the model. In embodiments, the answer generation process starts with the start sign <BOA> and uses the model to calculate the probability distribution of the next word. A beam search scheme may then be used to keep the best K candidates with the maximum probabilities according to the Softmax layer. The process is repeated until the model generates an end sign of the answer <EOA>.

Figure 5:
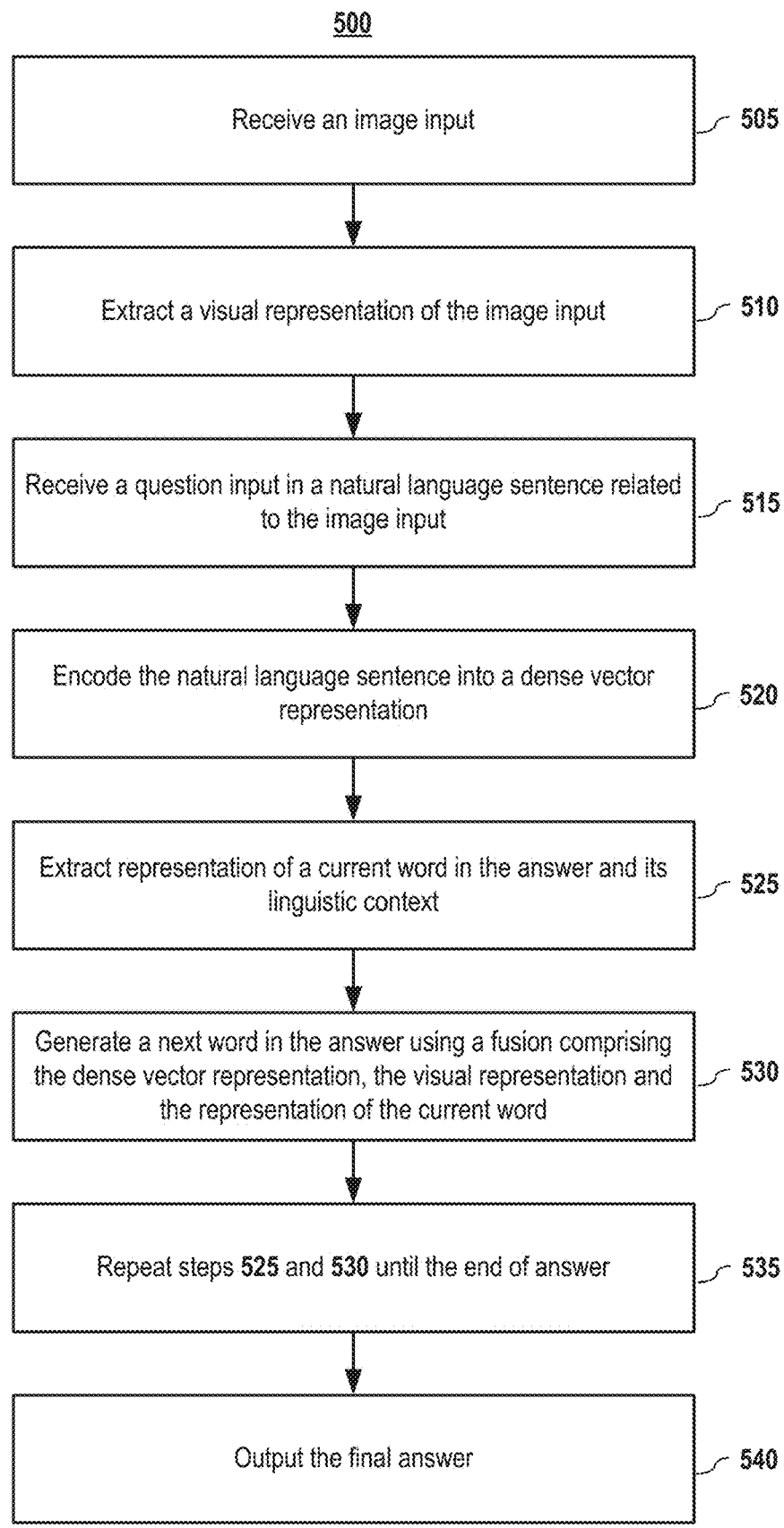
FIG. 5 depicts an exemplary flow diagram for image question answering according to embodiments of the present disclosure.

FIG. 5 depicts an exemplary flow diagram for image question answering according to embodiments of the present disclosure. In embodiments, the mQA model receives an image input in step 505 and extracts a visual representation out of the image input in step 510. The mQA model also receives a question input in a natural language sentence related to the image input in step 515 and encodes the natural language sentence into a dense vector representation in step 520. It shall be noted that the mQA model may receive the image input and question input in different order or concurrently instead of receiving the image input first. In step 525, the mQA model extracts a representation of a current word in the answer and its linguistic context. In step 530, a next word in the answer is generated using a fusion comprising the dense vector representation, the visual representation, and the representation of the current word. Steps 525 and 530 are repeated until an end of answer <EOA> is reached. Finally, the model outputs the final multi-word answer in step 540.

1. Embodiments of Components of an mQA Model a) Component (I)

In embodiments, the semantic meaning of the question is extracted by the first component 210 of the model. In embodiments, it contains a 512 dimensional word embedding layer 212 and an LSTM layer 214 with 400 memory cells. The function of the word embedding layer is to map a one-hot vector of the word into a dense semantic space. This dense word representation is feed into a LSTM layer.

In embodiments, the LSTM layer is a Recurrent Neural Network (RNN) designed for solving the gradient explosion or vanishing problem. The LSTM layer stores the context information in its memory cells and serves as the bridge among the words in a sequence (e.g., a question). In embodiments, to model the long-term dependency in the data more effectively, the LSTM layer adds three gate nodes to the traditional RNN structure: the input gate, the output gate, and the forget gate. The input gate and output gate regulate the read and write access to the LSTM memory cells. The forget gate resets the memory cells when their contents are out of date. Different from prior approaches, in embodiments, the image representation does not feed into the LSTM layer in this component because questions are just another input source for the model. This approach is reasonable because the questions are treated as another input source for the model, so images should not be added as the supervision for them. The information stored in the LSTM memory cells of the last word in the question (i.e., the question mark) will be treated as the representation of the sentence.

b) Component (II)

In embodiments, the second component 220 is a deep Convolutional Neural Network (CNN) that generates a representation of an image. In some embodiments, the GoogleNet is used. It is noted that other CNN models, such as AlexNet and VggNet, may also be used. In embodiments, the final SoftMax layer of the deep CNN is removed and the remaining top layer is connected to the embodiments of the models presented herein.

c) Component (III)

In embodiments, the third component is the second LSTM component 230, which contains a second word embedding layer 232 and a second LSTM layer 234. The structure of the third component is similar to the first component. The activation of the memory cells for the words in the answer, as well as the word embeddings, may be fed into the fusing component to generate the next words in the answer.

In some prior approaches, training question and answer are concatenated, and a single LSTM is used. Because of the different properties (i.e., grammar) of questions and answers, in embodiments herein, two separate LSTMs are used for questions and answers respectively. The LSTM layers for the question and the answer may be denoted as LSTM(Q) and LSTM(A), respectively, herein. In embodiments, the weight matrix in LSTM(Q) is not shared with the LSTM(A) in the first components. It is noted that the semantic meaning of single words should be the same for questions and answers so that the parameters in the word-embedding layer for the first and third component may be shared.

d) Component (IV)

Figure 6:
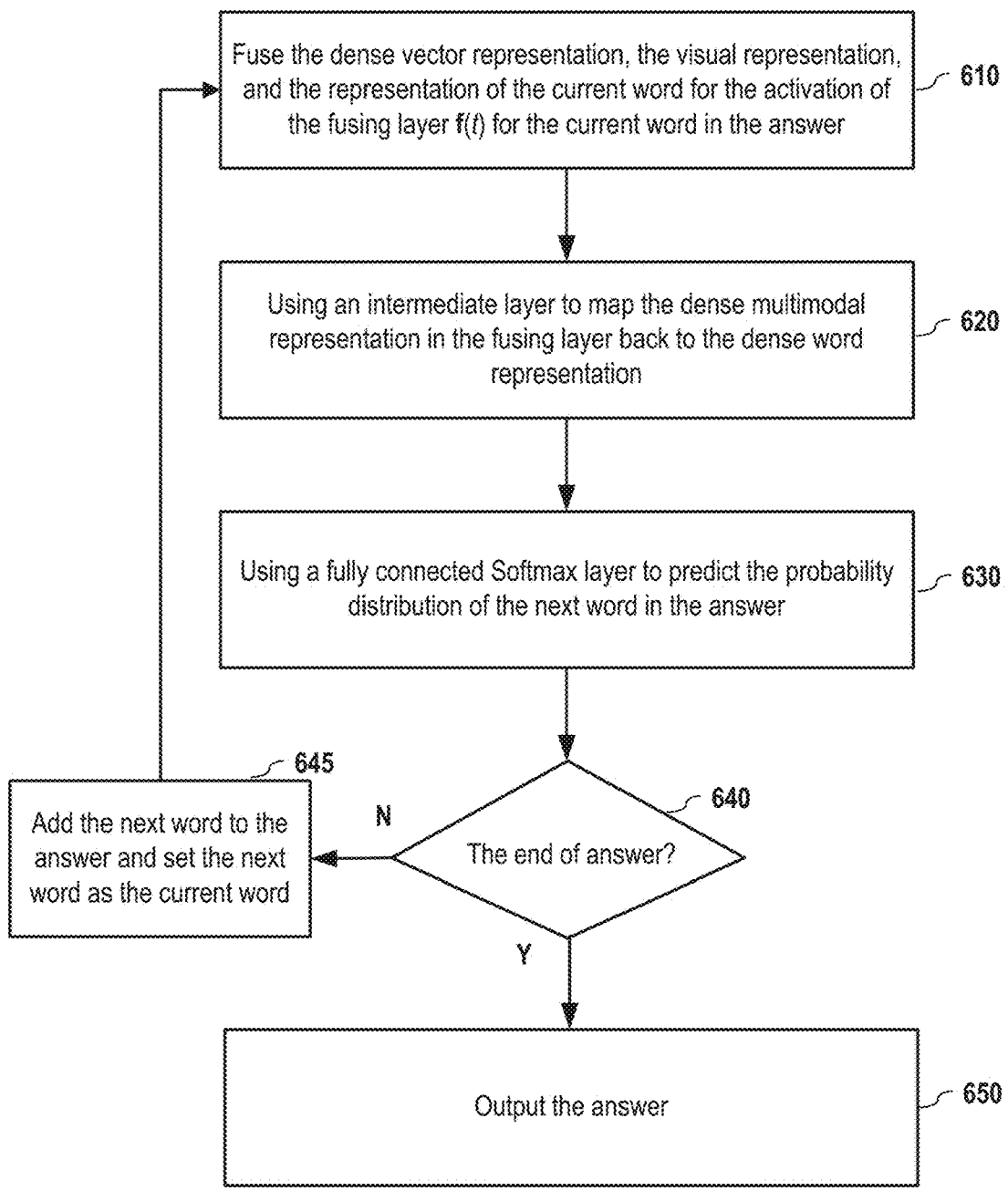
FIG. 6 depicts a method for generating the final answer using a fusion component of a mQA system according to embodiments of the present disclosure.

Finally, in embodiments, the fourth component 240 fuses the information from the first three layers. In embodiments, the fourth component 240 comprises a fusing layer 242, an intermediate layer 244, and a Softmax layer 246. FIG. 6 depicts a method for generating the final answer using a fusion component of the mQA system according to embodiments of the present disclosure.

In embodiments, the fusing layer 242 fuses the dense vector representation, the visual representation, and the representation of the current word for the activation of the fusing layer f(t) for the current word in the answer. Specifically, the activation of the fusing layer f(t) for the $t^{th}$ word (or the current processing answer word) in the answer can be calculated as follows:

$$f(t)=g(V_{r_Q}r_Q+V_I I+V_{r_A}r_A(t)+V_w w(t)); \quad (1)$$

where "+" denotes element-wise addition, $r_Q$ stands for the activation of the LSTM(Q) memory cells of the last word in the question, I denotes the image representation, $r_A(t)$ and w(t) denotes the activation of the LSTM(A) memory cells and the word embedding of the $t^{th}$ word in the answer respectively. $V_{r_Q}$, $V_I$, $V_{r_A}$, and $V_w$ are the weight matrices that are learned. $g(\cdot)$ is an element-wise non-linear function.

In embodiments, after the fusing layer 242, the intermediate layer 246 maps the dense multimodal representation in the fusing layer back to the dense word representation in step 620. In embodiments, a fully connected Softmax layer 246 in step 630 predicts the probability distribution of the next word in the answer. This strategy allows the weight sharing between word embedding layer and the fully connected Softmax layer (see details in Subsection 2, below).

In embodiments, a sigmoid function is used as the activation function of the three gates and a ReLU is adopted as the non-linear function for the LSTM memory cells. In embodiments, the non-linear activation function for the word embedding layer, the fusing layer, and the intermediate layer is a scaled hyperbolic tangent function: $(x)=1.7159 \cdot \tanh(\frac{2}{3}x)$.

At step 640, the next word predicted in step 630 is verified whether it is the end of answer (e.g., <EOA>). If it is not the end of the answer, the process goes returns to step 645, in which the next word is added to the answer and set as the current word, to reiterate the process of fusion layer activation for the current word, the next answer word prediction and generation (steps 610-630). If it is the end of the answer, the component yes, the system outputs the final answer in step 650.

2. The Weight Sharing Strategy

As mentioned in Section B, the mQA system adopts different LSTMs for the question and the answer because of the different grammar properties of questions and answers. However, the meaning of single words in both questions and answers should be the same. Therefore, the weight matrix between the word-embedding layers of the first component and the third component may be shared.

In addition, this weight matrix for the word-embedding layers may be shared with the weight matrix in the fully connected Softmax layer in a transposed manner, as shown in FIGS. 2 and 3. Intuitively, the function of the weight matrix in the word-embedding layer is to encode the one-hot word representation into a dense word representation. The function of the weight matrix in the Softmax layer is to decode the dense word representation into a pseudo one-word representation, which is the inverse operation of the word embedding. This strategy reduces nearly half of the parameters in the model and provides better performance in image captioning and novel visual concept learning tasks.

3. Training Details

Figure 7A:
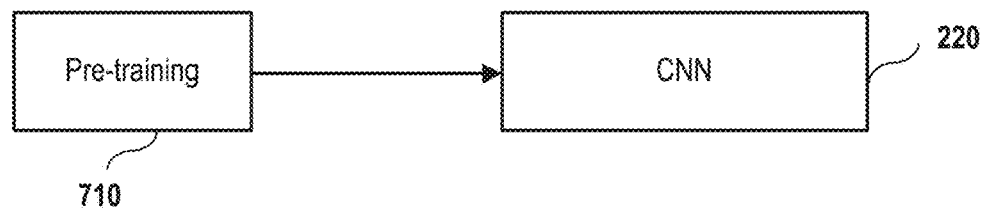
FIG. 7A depicts a method of training the Convolutional Neural Network component according to embodiments of the present disclosure.
Figure 7B:
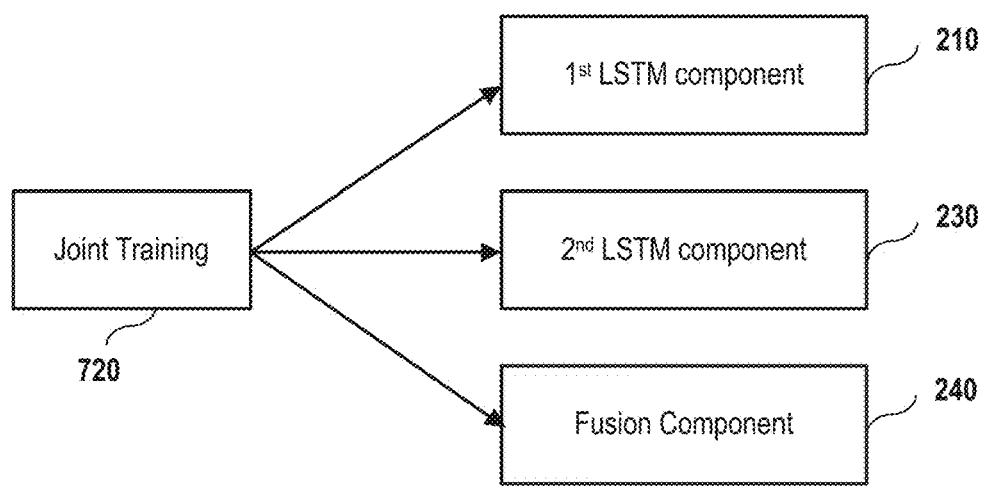
FIG. 7B depicts a method of joint-training the first LSTM component, the second LSTM component, and the fusion component according to embodiments of the present disclosure.

In embodiments, the CNN may be pre-trained. For example, the CNN may be pre-trained as shown block 710 in FIG. 7A on the ImageNet classification task. This component may also be fixed during the QA training. A log-likelihood loss defined on the word sequence of the answer is adopted. Minimizing this loss function is equivalent to maximizing the probability of the model to generate the ground truth answers in the training set. In embodiments, the first, third and the fourth components are jointly trained as shown block 720 in FIG. 7B using stochastic gradient decent method. In embodiments, the initial learning rate is 1 and is decreased by a factor of 10 for every epoch of the data. In embodiments, the training is stopped when the loss on the validation set does not decrease (or does not decrease by a threshold amount) within three epochs. In embodiments, the hyperparameters of the model are selected by cross-validation. It shall be noted that these training examples are provided by way of illustration and were performed under specific conditions using a specific embodiment or embodiments; accordingly, they shall not be used to limit the scope of the disclosure of the current patent document.

For the Chinese question answering task, the sentences are segmented into several word phrases. These phrases can be treated equivalently to the English words.

D. The Freestyle Multilingual Image Question Answering (FM-IQA) Dataset

Some embodiments were trained and evaluated on a large-scale multilingual visual question answering dataset. In Subsection 1 (below), a process of collecting data is described, and a method to monitor the quality of annotations is also described. Some statistics and examples of the dataset are given below in Subsection 2.

1. The Data Collection

The initial image set started with the 158,392 images from the newly released MS COCO training, validation, and testing set. The annotations were collected using Baidu's online crowdsourcing server. To make the labeled question-answer pairs diversified, the annotators were free to give any type of questions, as long as these questions were related to the content of the image. The question should be answered by the visual content and commonsense (e.g., it is not expected to get questions such as "What is the name of the person in the image?"). The annotators needed to give an answer to the question themselves.

On the one hand, the freedom given to the annotators was beneficial in order to get a freestyle, interesting, and diversified set of questions. On the other hand, it made it harder to control the quality of the annotation compared to a more detailed instruction. To monitor the annotation quality, an initial quality filtering stage was conducted. Specifically, 1,000 images were randomly sampled as a quality monitoring dataset from the MS COCO dataset as an initial set for the annotators (they did not know this is a test). Some annotations were then sampled and their quality was rated after each annotator finished some labeling on this quality monitoring dataset (about 20 question-answer pairs per annotator). Only a small number of annotators (195 individuals) whose annotations were satisfactory (i.e., the questions were related to the content of the image and the answers are correct) were selected. Preference was also given to the annotators who provided interesting questions that require high level reasoning to give the answer. Only the selected annotators were permitted to label the rest of the images. A set of good and bad examples of the annotated question-answer pairs from the quality monitoring dataset were picked and shown to the selected annotators as references. Reasons were also provided for selecting these examples. After the annotation of all the images was finished, the dataset was further refined and a small portion of the images with badly labeled questions and answers were removed.

2. The Statistics of the Dataset

Currently, there are 158,392 images with 316,193 Chinese question-answer pairs and their English translations. Each image has at least two question-answer pairs as annotations. The average lengths of the questions and answers are 7.38 and 3.82 respectively measured by Chinese words. One thousand (1,000) question-answer pairs and their corresponding images were randomly sampled as the test set.

The questions in this dataset are diversified, which requires a vast set of artificial intelligent (AI) capabilities in order to answer them. They contain some relatively simple image understanding questions of, for example, the actions of objects (e.g., "What is the boy in green cap doing?"), the object class (e.g., "Is there any person in the image?"), the relative positions and interactions among objects (e.g., "Is the computer on the right or left side of the gentleman?"), and the attributes of the objects (e.g., "What is the color of the frisbee?"). In addition, the dataset contains some questions that need a high-level reasoning with clues from vision, language, and commonsense. For example, to answer the question "Why does the bus park there?", it should be known that this question is about the parked bus in the image with two men holding tools at the back. Based on commonsense, there might be some problems with the bus and the two men in the image are trying to repair it. These questions are hard to answer but it is believed they are actually the most interesting part of the questions in the dataset. The questions are categorized into 8 types and the statistics of them is also shown on the project page.

The answers are also diversified. The annotators were allowed to give a single phrase or a single word as the answer (e.g. "Yellow") or, they could give a complete sentence (e.g., "The frisbee is yellow").

E. Experiments

It shall be noted that these experiments and results are provided by way of illustration and were performed under specific conditions using a specific embodiment or embodiments; accordingly, neither these experiments nor their results shall be used to limit the scope of the disclosure of the current patent document. For some very recent works for visual question answering, the methods were tested on datasets where the answer to the question was a single word or a very short phrase. Under this setting, it is plausible to use automatic evaluation metrics that measure the single word similarity, such as Wu-Palmer similarity measure (WUPS). However, for the newly proposed dataset discussed herein, the answers in the dataset are freestyle and could be complete sentences. For most of the cases, there are numerous choices of answers that are all correct. The possible alternatives are BLEU score, METEOR, CIDEr, or other metrics that are widely used in the image captioning task. A problem of these metrics is that there are only a few words in an answer that are semantically critical. These metrics tend to give equal weights (e.g., BLEU and METEOR) or different weights according to the term frequency-inverse document frequency (tf-idf) term (e.g., CIDEr) of the words in a sentence, hence cannot fully show the importance of the keywords. The evaluation of the image captioning task suffers from the same problem (not as severe as question answering because it only needs a general description).

To avoid these problems, a real Visual Turing Test was conducted using human judges for the presented model, which will be described in details in Subsection 1, below. In addition, each generated sentence with a score (the larger the better) is rated as described in Subsection 2 below, which gives a more fine-grained evaluation. In Subsection 3, the performance comparisons of different variants of the mQA model on the validation set are provided.

1. The Visual Turing Test

In this Visual Turing Test, a human judge was presented with an image, a question, and the answer to the question generated by the testing model or by human annotators. He or she needed to determine, based on the answer, whether the answer was given by a human (i.e., pass the test) or a machine (i.e., fail the test).

In practice, the images and questions from the test set of the presented FM-IQA dataset were used. An embodiment of the mQA system was used to generate the answer for each question. A baseline model of the question answering without visual information is also implemented. The structure of this baseline model is similar to embodiments of the mQA system, except that the image information extracted by the CNN is not fed into the fusing layer. It is denoted as blind-QA. The answers generated by the presented mQA model, the blind-QA model and the ground truth answer are mixed together. This led to 3000 question answering pairs with the corresponding images, which were randomly assigned to 12 human judges.

The results are shown in Table 1. It shows that 64.7% of the answers generated by the example mQA model are treated as answers provided by a human. The blind-QA performs very badly in this task. But some of the generated answers pass the test. Because some of the questions are actually multi-choice questions, it is possible to get a correct answer by random guess based on pure linguistic clues.

TABLE 1

The results of an embodiment of the mQA model for the FM-IQA dataset

| | Visual Turing Test | | | Human Rated Scores | | | |
|---|---|---|---|---|---|---|---|
| | Pass | Fail | Pass rate (%) | 2 | 1 | 0 | Ave. Score |
| Human | 948 | 52 | 94.8 | 927 | 64 | 9 | 1.918 |
| Blind-QA | 340 | 660 | 34.0 | — | — | — | — |
| mQA | 647 | 353 | 64.7 | 628 | 198 | 174 | 1.454 |

To study the variance of the VTT evaluation across different sets of human judges, two additional evaluations were conducted with different groups of judges under the same setting. The standard deviations of the passing rate were 0.013, 0.019, and 0.024 for human, the blind-mQA model, and the mQA model embodiment, respectively. It shows that VTT is a stable and reliable evaluation metric for this task.

2. The Score of the Generated Answer

The Visual Turing Test gives a rough evaluation of the generated answers. A fine-grained evaluation was also conducted with scores of "0", "1", or "2". "0" and "2" meant that the answer was totally wrong and perfectly correct respectively. "1" meant that the answer was only partially correct (e.g., the general categories are right but the sub-categories were wrong) and made sense to the human judges. The human judges for this task are not necessarily the same people for the Visual Turing Test. After collecting the results, it was found that some human judges also rated an answer with "1" if the question was very hard to answer so that even a human, without carefully looking at the image, would possibly make mistakes.

The results are shown in Table 1. It is shown that among the answers that are not perfectly correct (i.e., scores are not 2), over half of them are partially correct. Similar to the VTT evaluation process, two additional groups were also conducted using this scoring evaluation. The standard deviations of human and the presented mQA model are 0.020 and 0.041 respectively. In addition, for 88.3% and 83.9% of the cases, the three groups gave the same score for human and output of the tested mQA system embodiment, respectively.

3. Performance Comparisons of the Different mQA Variants

In order to show the effectiveness of the different components and strategies of the mQA model, three variants of the mQA were implemented. For the first variant (i.e., "mQA-avg-question"), the first LSTM component 210 of the model (i.e., the LSTM to extract the question embedding) was replaced with the average embedding of the words in the question using word2vec. This was used to show the effectiveness of the LSTM as a question embedding learner and extractor. For the second variant (i.e. "mQA-same-LSTMs"), two shared-weights LSTMs were used to model question and answer. This was used to show the effectiveness of the decoupling strategy of the weights of the LSTM (Q) and the LSTM(A) in embodiments of the model. For the third variant (i.e., "mQA-noTWS"), the Transposed Weight Sharing (TWS) strategy is not adopted. This was used to show the effectiveness of TWS.

The word error rates and losses of the three variants and the complete mQA model (i.e. mQAcomplete) are shown in Table 2. All of the three variants perform worse than the presented mQA model.

TABLE 2

Performance comparisons of the different mQA variants

| | Word Error | Loss |
|---|---|---|
| mQA-avg-question | 0.442 | 2.17 |
| mQA-same-LSTMs | 0.439 | 2.09 |
| mQA-no TWS | 0.438 | 2.14 |
| mQA-complete | 0.393 | 1.91 |

F. Discussion

Figure 8:
FIG. 8 depicts an example generated answer based upon an input question and input image according to embodiments of the present disclosure.

In this disclosure, embodiments of a mQA model are presented to give a sentence or a phrase as the answer to a freestyle question for an image. To validate effectiveness, a Freestyle Multilingual Image Question Answering (FM-IQA) dataset containing over 310,000 question-answer pairs was constructed. Embodiments were evaluated using human judges through a real Turing Test. It showed that 64.7% of the answers given by an embodiment of the mQA model were treated as the answers provided by a human. The FM-IQA dataset may be used for other tasks, such as visual machine translation, where the visual information can serve as context information that helps to remove ambiguity of the words in a sentence. In embodiments, the LSTM in the first component was also modified to a multimodal LSTM. This modification allows the generation of a free-style question about the content of image, and provides an answer to this question. An example result is shown in FIG. 8.

Aspects of the present patent document are directed to a computing system. For purposes of this disclosure, a computing system may include any instrumentality or aggregate of instrumentalities operable to compute, calculate, determine, classify, process, transmit, receive, retrieve, originate, route, store, display, communicate, manifest, detect, record, reproduce, handle, or utilize any form of information, intelligence, or data for business, scientific, control, or other purposes. For example, a computing may be a personal computer (e.g., desktop or laptop), tablet computer, mobile device (e.g., personal digital assistant (PDA) or smart phone), server (e.g., blade server or rack server), a network device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 9:
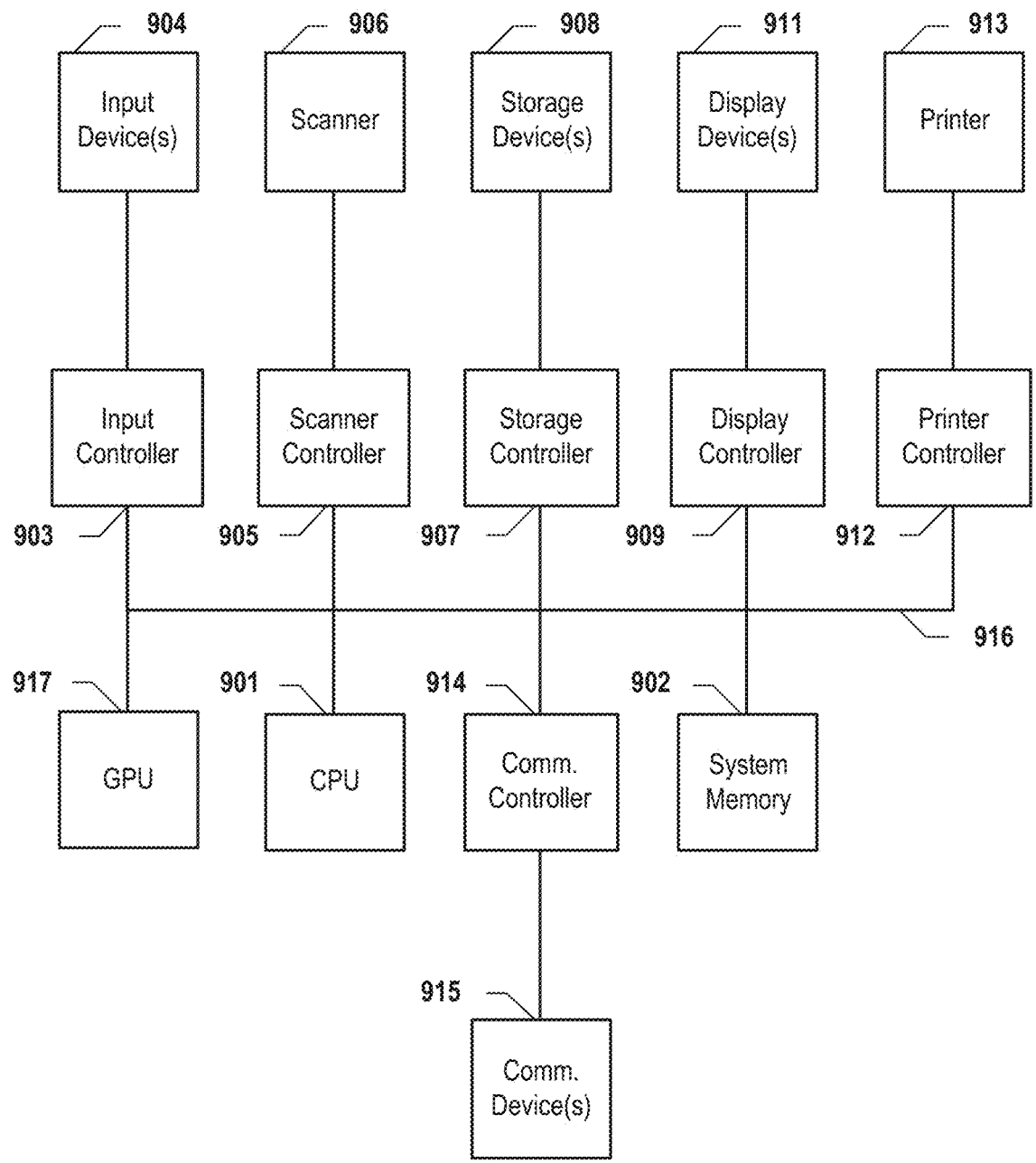
FIG. 9 depicts a simplified block diagram of a computing system for the implementation of a multimodal question answering according to embodiments of the present disclosure.

FIG. 9 depicts a block diagram of a computing system 900 according to embodiments of the present invention. It will be understood that the functionalities shown for system 900 may operate to support various embodiments of a computing system—although it shall be understood that a computing system may be differently configured and include different components. As illustrated in FIG. 9, system 900 includes one or more central processing units (CPU) 901 that provides computing resources and controls the computer. CPU 901 may be implemented with a microprocessor or the like, and may also include one or more graphics processing units (GPU) 917 and/or a floating point coprocessor for mathematical computations. System 900 may also include a system memory 902, which may be in the form of random-access memory (RAM), read-only memory (ROM), or both.

A number of controllers and peripheral devices may also be provided, as shown in FIG. 9. An input controller 903 represents an interface to various input device(s) 904, such as a keyboard, mouse, or stylus. There may also be a scanner controller 905, which communicates with a scanner 906. System 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present invention. Storage device(s) 908 may also be used to store processed data or data to be processed in accordance with the invention. System 900 may also include a display controller 909 for providing an interface to a display device 911, which may be a cathode ray tube (CRT), a thin film transistor (TFT) display, or other type of display. The computing system 900 may also include a printer controller 912 for communicating with a printer 913. A communications controller 914 may interface with one or more communication devices 915, which enables system 900 to connect to remote devices through any of a variety of networks including the Internet, an Ethernet cloud, a Fiber Channel over Ethernet (FCoE)/Data Center Bridging (DCB) cloud, a local area network (LAN), a wide area network (WAN), a storage area network (SAN) or through any suitable electromagnetic carrier signals including infrared signals.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

It should be understood that various system components may or may not be in physical proximity to one another. For example, image/question input and answer output may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It shall be noted that elements of the claims, below, may be arranged differently including having multiple dependencies, configurations, and combinations. For example, in embodiments, the subject matter of various claims may be combined with other claims.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

The invention claimed is:

1. A computer-implemented method that improves computer-user interaction by generating an answer to a question input related to an image input, the method comprising:
   receiving the question input in a natural language form;
   receiving the image input related to the question input; and
   inputting the question input and the image input into a multimodal question answering (mQA) model to generate the answer comprising multiple words generated sequentially, the mQA model comprising:
     a first component that encodes the question input into a dense vector representation;
     a second component to extract a visual representation of the image input;
     a third component, which is distinct from the first component, to extract a representation of at least the current word in the answer; and
     a fourth component to generate a next word after the current word in the answer, the fourth component comprising a fusion component, which receives as inputs and combines the dense vector representation, the visual representation, and the representation of the at least the current word in the answer.

2. The computer-implemented method of claim 1 wherein the first component is a first long short-term memory (LSTM) network comprising a first word-embedding layer and a first LSTM layer.

3. The computer-implemented method of claim 2 wherein the third component is a second LSTM network comprising a second word-embedding layer and a second LSTM layer.

4. The computer-implemented method of claim 3 wherein the first word-embedding layer shares a weight matrix with the second word-embedding layer.

5. The computer-implemented method of claim 3 wherein the first LSTM layer does not share a weight matrix with the second LSTM layer.

6. The computer-implemented method of claim 1 wherein the second component is a deep Convolutional Neural network (CNN).

7. The computer-implemented method of claim 1 further comprising:
   the fourth component iteratively generating a next word until a stop indicator is generated, wherein the next word obtained for a current iteration becomes the current word for a next iteration.

8. The computer-implemented method of claim 1 wherein the first, the third, and the fourth components are jointly trained.

9. The computer-implemented method of claim 3 wherein the fusion component is a fusing layer and the fourth component further comprises:
   the fusing layer that fuses information from the first LSTM layer, the second LSTM layer, and the second component to generate a dense multimodal representation;
   an intermediate layer that maps the dense multimodal representation in the fusing layer to a dense word representation; and
   a softmax layer that predicts a probability distribution of the next word in the answer using the dense word representation.

10. A computer-implemented method that improves computer-user interaction by generating an answer to a question input related to an image input, the method comprising:
    extracting a question representation representing a semantic meaning of the question input using a first long short-term memory (LSTM) component comprising a first word-embedding layer and a first LSTM layer;

generating a representation of the image input related to the question input using a deep Convolutional Neural network (CNN) component;

extracting a representation of at least a current word of the answer using a second LSTM component, which is distinct from the first LSTM component, comprising a second word-embedding layer and a second LSTM layer; and predicting a next word of the answer using a fusing component, which receives as inputs the question representation, the representation of the image input, and a representation of the at least the current word of the answer and combines them to obtain a dense multimodal representation.

11. The computer-implemented method of claim 10 wherein the first word-embedding layer shares a weight matrix with the second word-embedding layer.

12. The computer-implemented method of claim 10 wherein the first LSTM layer does not share a weight matrix with the second LSTM layer.

13. The computer-implemented method of claim 10 wherein the deep CNN is pre-trained and is fixed during question answering training.

14. The computer-implemented method of claim 10 wherein the step of predicting the next word in the answer comprises:

fusing information from the first LSTM layer, the second LSTM layer, and the deep CNN in a fusion layer of the fusion component to generate the dense multimodal representation;

mapping in an intermediate layer the dense multimodal representation to a dense word representation; and predicting using a softmax layer and the dense word representation, a probability distribution of the next word in the answer.

15. The computer-implemented method of claim 14 wherein the dense multimodal representation from the fusion layer represents an output from a non-linear activation function operating on a learned weighted combination of the information from the first LSTM layer, the second LSTM layer, and the deep CNN.

16. The computer-implemented method of claim 10 further comprising:

repeating the steps of extracting a representation of at least a current word and of predicting a next word of the answer until a stop indicator is reached, wherein the next word obtained for a current iteration becomes the current word for a next iteration.

17. The computer-implemented method of claim 14 wherein the first word-embedding layer, the second word-embedding layer, and the softmax layer share a weight matrix.

18. A non-transitory computer-readable medium or media comprising one or more sequences of instructions which, when executed by one or more processors, causes the steps to be performed comprising:

responsive to receiving from a user a question input, extracting a question representation representing the question input;

responsive to receiving an image input related to the question input, generating a representation of the image input;

starting with a start sign as a current word in an answer to the question input about the image input, generating a next word using a fusion of the question representation generated by a first component, the representation of the image input generated by a second component, and a representation of at least the current word in the answer generated by a third component that is distinct from the first component, which are combined using a fusing component that receives the question representation, the representation of the image input, and the representation of at least the current word in the answer as inputs;

responsive to the next word not being an end sign:
adding the next word to the answer; and
setting the next word of the answer as the current word of the answer and returning to the step of generating a next word in the answer; and responsive to obtaining the end sign as the next word, outputting the answer.

19. The non-transitory computer-readable medium or media of claim 18 wherein the step of generating a next word comprises:

combining the question representation, the representation of the image input, and the representation of at least the current word in the answer in a fusion layer of the fusion component to obtain a dense multimodal representation;

mapping in an intermediate layer the dense multimodal representation to a dense word representation; and predicting, using a softmax layer and the dense word representation, a probability distribution of the next word in the answer.

20. The non-transitory computer-readable medium or media of claim 19 wherein the softmax layer has a weight matrix to decode the dense word representation into a pseudo one-word representation.

* * * * *